Sept. 21, 1937. H. V. GREEN Re. 20,510

ALTERNATING CURRENT OSCILLATING MOTOR

Original Filed July 22, 1922 2 Sheets-Sheet 1

Inventor
HAROLD V. GREEN.
By Lewis D. Konigsford
Attorney

Sept. 21, 1937. H. V. GREEN Re. 20,510

ALTERNATING CURRENT OSCILLATING MOTOR

Original Filed July 22, 1922 2 Sheets-Sheet 2

INVENTOR.
HAROLD V. GREEN.

BY Lewis D. Konigsford
ATTORNEY.

Reissued Sept. 21, 1937

Re. 20,510

UNITED STATES PATENT OFFICE 20,510

ALTERNATING CURRENT OSCILLATING MOTOR

Harold V. Green, Chicago, Ill., assignor to General Electric Company, a corporation of New York Original No. 1,493,259, dated May 6, 1924, Serial No. 576,711, July 22, 1922. Application for reissue May 15, 1937, Serial No. 142,889

5 Claims. (Cl. 172—126)

My invention relates to alternating current motors of the reciprocating type and its principal object is to provide an improved motor of its class both as regards simplicity of construction and efficiency. A further object is to eliminate the necessity of all switching devices other than the line switch. Other advantages of my improved motor will appear as the description proceeds.

The features of my invention which I believe to be novel and patentable will be pointed out in the claims appended hereto. The construction and theory of operation of a motor built in accordance with my invention will now be described in connection with the accompanying drawings in which Fig. 1 shows a section through the motor and Fig. 2 a top view of the same.

Figure 3:
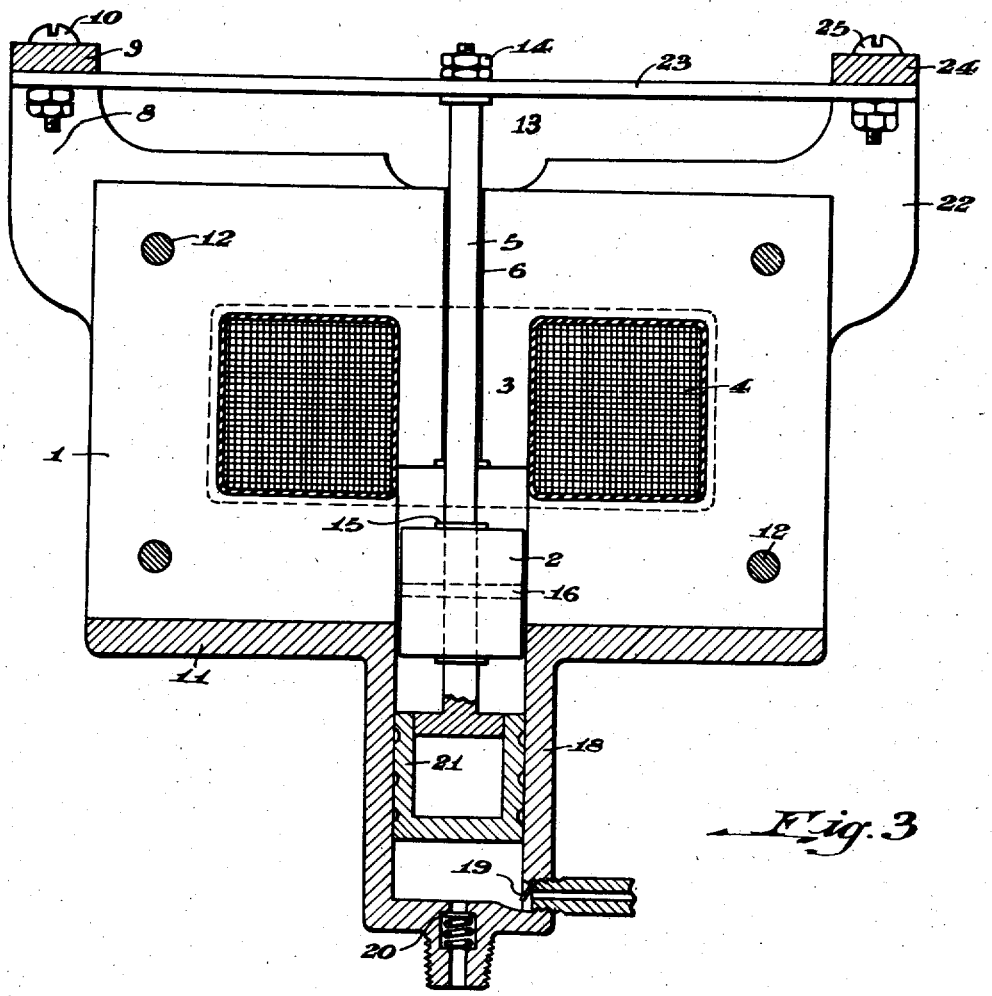

Figure 3 shows a section through a further modification.

Figure 1:
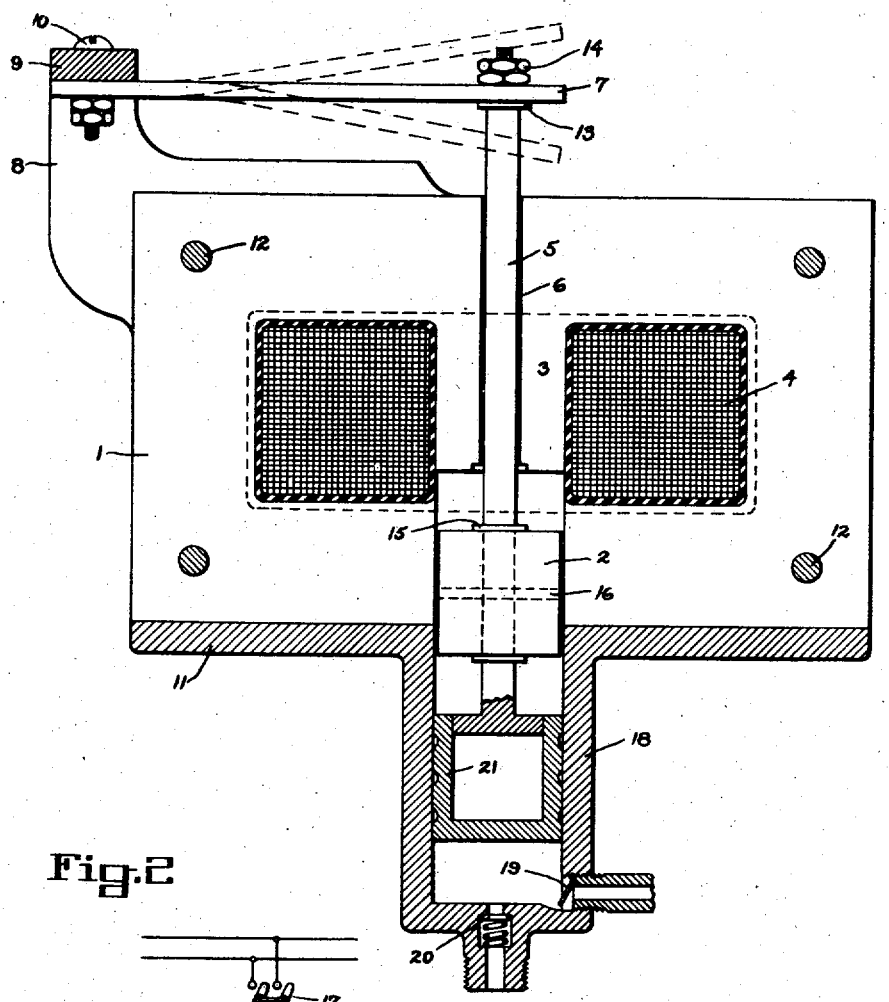

Referring now to the drawings and more in particular to Fig 1, my improved motor comprises an alternating current electro-magnet adapted to be excited with single phase current, an armature adapted to be vibrated in synchronism with said alternating current and a spring connected to the armature adjusted to have the same period of vibration as the armature. In the illustration the magnetic circuit of the electro-magnet is in the form of a nearly closed E-shaped structure 1, preferably laminated. The armature 2 is mounted in the open side of the E and arranged to reciprocate back and forth in the opening toward and away from the middle leg 3 in response to flux impulses produced by single phase current in the coil 4 wound about the middle leg 3. The armature 2 is rigidly secured to a rod 5 preferably of non-magnetic material, such as brass, which in the present instance passes through an opening 6 in the middle leg 3. The rod 5 is secured in any suitable manner to the free end of a spring reed 7. The other end of the reed is clamped to the stationary portion of the motor, for example, by means of the frame 8, strap 9 and bolt 10. The frame 8 preferably forms a casing integral with the base 11, between the sides of which the laminations 1 are clamped by means of bolts 12. The ends and top of the casing thus formed are left open and a central opening indicated in dotted lines in Fig. 1 is provided in the two side pieces through which the coil 4 extends.

With the arrangement illustrated, the extent of vibration of the reed 7, rod 5 and armature 2 is indicated by the dotted line positions of reed 7 in Fig. 1. Where the amplitude of vibration is short and the reed 7 fairly long, the reed may be rigidly secured to rod 5, in which case the rod 5 will be made slightly flexible and the clearance around armature 2 and rod 5 sufficient to permit the slight lateral movement of the free end of reed 7. This movement may also be taken care of by providing a small clearance between rod 5 and the opening in reed 7 and adjusting the lock nuts 14 with respect to collar 13 so that reed 7 may slide relative thereto. Rod 5 might also be provided with a hinged joint just below collar 13 for this purpose. The length of reed 7 may be made adjustable if desired in order to permit the use of the motor on different frequency sources. The armature 2 is secured to rod 5 in any convenient manner such as by collars 15 and pin 16.

When the winding 4 is excited from a source of single phase alternating current, the armature 2 will tend to oscillate back and forth in synchronism therewith and preferably with a period of vibration equal in value to the magnetic alternations; that is, twice the frequency of the alternating current source. Unless the spring 7 is selected to have a period of vibration equal to that of the armature, the amplitude will be very small, due to the inertia of the moving parts. In order to produce a useful vibration of the armature 2, spring 7 is selected to have a natural period of vibration equal to, or substantially equal to, the frequency of the single phase source or some multiple thereof. In other words, I make use of the phenomena of mechanical resonance. The most practical arrangement for commercial frequencies will be where the period of vibration of the spring is equal to twice the frequency of the single phase source. The resonant spring 7 serves to keep the armature in vibration with a small amount of assistance from the electrical winding 4, leaving the major part of the energy developed by the winding for application to the work at hand which, in the present illustration, comprises a direct connected compressor or pump.

Figure 2:
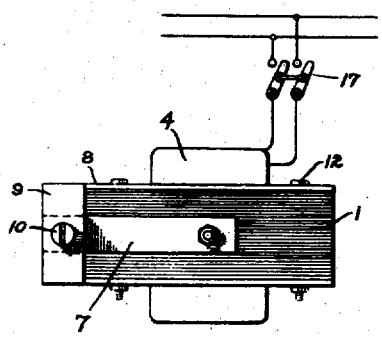

As illustrated in Fig. 2 the only switching device necessary for this motor is the line switch 17. The motor is self-starting due to the position of the armature when at rest. The first flux impulse through the armature will raise the latter slightly. As this flux impulse dies down, spring 7 will return the armature to a position somewhat below its first position and the armature will start to move upward again at the same time the second flux impulse, which is now in the reverse direction, becomes effective. The armature will soon attain its full amplitude of vibration and a certain amount of excess energy will be available for doing work. The power factor of the motor may be improved if desired by providing a static condenser in parallel therewith.

In the illustration the base casting 11 also forms a compression chamber 18 provided with an inlet valve 19 and an outlet valve 20. The rod 5 is extended below the armature 2 and attached to a piston 21 fitted in the compression chamber 18. The rod 5 is attached to the piston 21 in any convenient manner. As thus illustrated, fluid is drawn in through valve 19 on the upward stroke of the piston and is expelled through valve 20 on the downward stroke. The section of the compression chamber 18 occupied by the piston 21 is preferably cylindrical in shape although not necessarily so.

The motor of the present invention is not intended to do heavy work but in applications requiring small amounts of power the motor will compare favorably in efficiency and will be considerably less costly as compared to the small rotary type electric motors. I do not wish to be limited to the precise construction and use shown and described but seek to cover in the appended claims all modifications and usage coming fairly within the true scope of my invention. For instance, the spring 7 might be placed on the same end of the motor as the armature and the opening 6 in the middle leg 3 omitted. Likewise, in some cases, it may be preferable to use a spring rigidly secured at both ends to the stationary part of the motor and have the middle of the spring constitute the vibrating portion and secured to the armature.

Referring to Figure 3, wherein like reference characters denote like parts, the motor has a frame 22 secured thereto opposite the frame 8, and a spring 23 has its both ends rigidly secured to the straps 9 and 24 respectively by bolts 10 and 25 respectively, the frame 22 being integral with the base 11. The middle of the spring 23 constitutes the vibrating portion and is secured to the armature 2 by the rod 5.

What I claim as new and desire to secure by Letters Patent of the United States, is:—

1. An electric motor of the alternating reciprocating type comprising an electromagnet adapted to be excited with single phase alternating current, an armature therefore adapted to be vibrated in synchronism with said current, a spring reed having one portion rigidly supported on a fixed abutment and another portion connected to said armature and adjusted to have the same period of vibration as said armature.

2. An electric motor of the reciprocating type comprising an electromagnet adapted to be excited by an electric current of such a nature as to produce therein regularly recurring flux pulsations, an armature therefor responsive to said flux pulsations and a spring having one portion in mechanical connection with said armature and another portion secured in fixed relation with respect to said electromagnet, the dimensions of said spring being such as to produce a condition of mechanical resonance between the armature and spring when said armature responds to said flux pulsations.

3. An electric motor of the reciprocating type comprising a frame, a core forming a partially closed magnetic circuit supported by said frame, an energizing coil for said core, a source of alternating current for exciting said coil, an armature mounted to reciprocate in the opening in said core in response to flux pulsations produced therein by said alternating current, a spring, having a natural period of vibrating synchronous with the frequency of said alternating current source, secured between said framework and armature and a machine operated by said motor and integral therewith.

4. An electric motor of the reciprocating type comprising a magnetic core, an energizing coil thereon, a source of alternating current for energizing said coil, an armature for said electromagnet mounted in a position to be moved in response to flux pulsations in said core and a spring of the vibrating type secured between said armature and core adapted to be flexed when said armature responds to a flux pulsation, said spring having a natural period of vibration synchronous with the frequency of said alternating current.

5. An electric motor of the reciprocating type comprising a three-leg core in the form of a substantially closed E, an energizing coil on the middle leg of said core, a source of electric energy for energizing said coil of such a nature as to produce in said core regularly recurring flux pulsations of a definite frequency, an armature in the open side of said E mounted in such a manner as to be moved toward the middle leg of said core in response to a flux pulsation therein, and a spring of the vibrating type mechanically connected between said armature and core, said spring having a natural period of vibration equal to the frequency of said flux pulsations.

HAROLD V. GREEN.